(12) United States Patent
Bui et al.

(10) Patent No.: US 7,921,202 B2
(45) Date of Patent: Apr. 5, 2011

(54) SYSTEM AND METHOD FOR PASSIVE INFORMATION CAPTURE, CACHE AND MATCHING TO FACILITATE UNINTERRUPTED TRANSACTIONS

(75) Inventors: Michelle P. Bui, Irvine, CA (US); Thomas T. Bui, Irvine, CA (US)

(73) Assignee: The Boeing Company, Chicago, IL (US)

( * ) Notice: Subject to any disclaimer, the term of this patent is extended or adjusted under 35 U.S.C. 154(b) by 423 days.

(21) Appl. No.: 11/735,714

(22) Filed: Apr. 16, 2007

(65) Prior Publication Data

US 2008/0256081 A1 Oct. 16, 2008

(51) Int. Cl.
*G06F 15/177* (2006.01)
*G06F 11/00* (2006.01)
*G06F 7/04* (2006.01)

(52) U.S. Cl. .............. 709/224; 714/4; 707/619

(58) Field of Classification Search ............ 707/3, 5, 707/7, 100, 204; 709/202, 203, 223, 224, 709/232; 714/4, 6, 13
See application file for complete search history.

(56) References Cited

U.S. PATENT DOCUMENTS

| | | | | |
|---|---|---|---|---|
| 5,852,724 | A * | 12/1998 | Glenn et al. ............... | 709/239 |
| 7,197,661 | B1 * | 3/2007 | Reynolds et al. .......... | 714/4 |
| 7,817,536 | B2 | 10/2010 | Purpura | |
| 2002/0103663 | A1 * | 8/2002 | Bankier et al. ............ | 705/1 |
| 2004/0088349 | A1 * | 5/2004 | Beck et al. ................ | 709/203 |
| 2005/0010582 | A1 * | 1/2005 | Saito et al. ................ | 707/100 |
| 2005/0273654 | A1 * | 12/2005 | Chen et al. ................ | 714/13 |
| 2006/0015764 | A1 * | 1/2006 | Ocko et al. ............... | 714/4 |
| 2006/0218210 | A1 * | 9/2006 | Sarma et al. ............... | 707/204 |
| 2006/0253575 | A1 * | 11/2006 | Carter et al. .............. | 709/224 |
| 2007/0027861 | A1 * | 2/2007 | Huentelman et al. ...... | 707/5 |
| 2007/0067452 | A1 | 3/2007 | Fung et al. | |
| 2007/0078959 | A1 * | 4/2007 | Ye ............................ | 709/223 |
| 2007/0143153 | A1 * | 6/2007 | Ashby et al. ............... | 705/5 |
| 2007/0206506 | A1 | 9/2007 | Purpura | |
| 2007/0206511 | A1 | 9/2007 | Purpura | |
| 2007/0274337 | A1 | 11/2007 | Purpura | |
| 2008/0056223 | A1 | 3/2008 | Manser | |
| 2008/0101252 | A1 | 5/2008 | Bui | |

(Continued)

OTHER PUBLICATIONS

U.S. Appl. No. 11/367,240, filed Mar. 3, 2006, William J. Purpura.

(Continued)

*Primary Examiner* — Wing F Chan
*Assistant Examiner* — Jonathan Willis
(74) *Attorney, Agent, or Firm* — Harness, Dickey & Pierce, P.L.C.

(57) ABSTRACT

A system and method for monitoring network communications between a consumer making a request for information on a network, and a provider that is providing the requested information. The system detects when the provider has not responded to an information request and provides stored information from a database that either matches, or nearly matches, the information being requested by the consumer. A network agent is used to continuously monitor and to supply the monitoring system with captured information requests and captured information sent by the provider in response to information requests from the consumer. The monitoring system uses metadata or other suitable parameters to categorize the information request and to associate it with the specific information that was captured, before storing both the information and the metadata and/or parameters in the database. Thus, the database is continuously populated as routine, successful communications occur over the database.

12 Claims, 5 Drawing Sheets

U.S. PATENT DOCUMENTS

2008/0123586 A1    5/2008  Manser

OTHER PUBLICATIONS

U.S. Appl. No. 11/511,885, filed Aug. 29, 2006, David Manser.
U.S. Appl. No. 11/511,890, filed Aug. 29, 2006, David Manser.
U.S. Appl. No. 11/522,288, filed Sep. 15, 2006, Casey Fung.
U.S. Appl. No. 11/589,341, filed Oct. 10, 2006, Thomas Bui.
U.S. Appl. No. 11/702,745, filed Feb. 6, 2007, William J. Purpura.
U.S. Appl. No. 11/702,746, filed Feb. 6, 2007, William J. Purpura.
U.S. Appl. No. 11/702,747, filed Feb. 6, 2007, William J. Purpura.

* cited by examiner

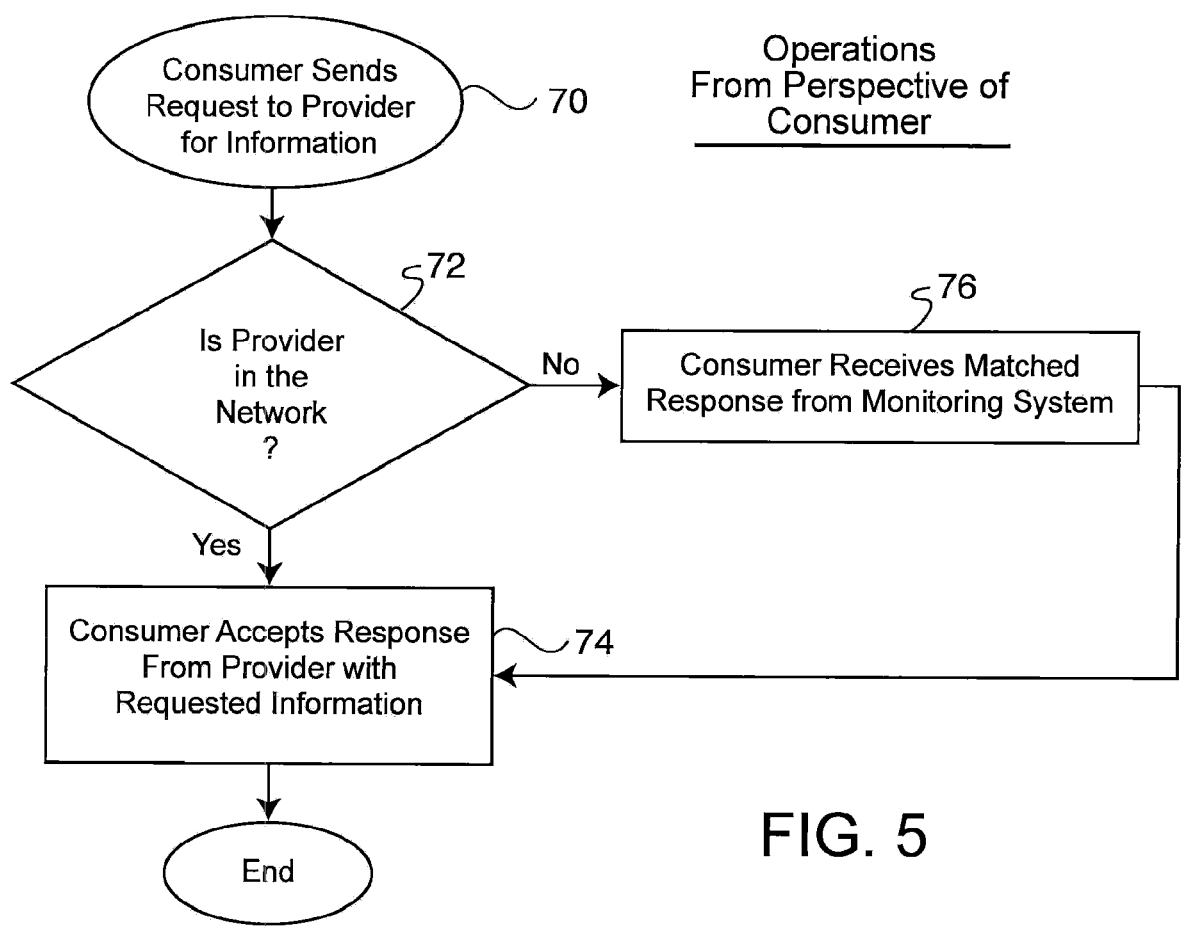

SYSTEM AND METHOD FOR PASSIVE INFORMATION CAPTURE, CACHE AND MATCHING TO FACILITATE UNINTERRUPTED TRANSACTIONS

FIELD

The present disclosure relates to systems and methods for facilitating uninterrupted transactions, and more particularly to a system and method that makes use of a network agent to monitor network communications between a consumer and a provider, to store monitored information, and to provide information to the consumer that corresponds specifically or generally to a request for information by the consumer in the event the provider is not able to answer the request.

BACKGROUND

The statements in this section merely provide background information related to the present disclosure and may not constitute prior art.

Presently, individuals communicating over a network, such as a wide area network like the Internet, operate in what is generally referred to as an "enterprise environment." In an enterprise environment, the communications means available to users are generally reliable and adequate in bandwidth to meet the needs of most users. Information services such as email, on-line search engines (e.g., GOOGLE®, YAHOO®, etc.) and directory lookup are generally accessible and reliable without significant connection issues, and thus are often taken for granted. In the enterprise environment, other resources that a user may wish to access and collaborate with are often available without any significant delay in connectivity and without interruption in connectivity. Thus, the individual is able to make informed decisions or to carry out actions after considering the obtained information.

A tactical environment, however, is dynamic with information providers and consumers joining and exiting the network at various times. For a tactical environment, the availability of the right data at the right time, for the right person is vital to decision making and mission success. Net Centric Operations in the tactical environment are often subject to conditions of low bandwidth, high jitter and intermittent connectivity. In addition, other information services such as messaging, data storage and information discovery may be marginal in performance or simply not available. Participants in this environment are often ad hoc participants, meaning that they join and leave the network unpredictably. Interactions between these participants, via their hardware and software, can be interrupted or degraded by the absence of the other participants that one may be relying on. When this happens, some participants may have not have the information or data needed for making sound decisions.

Additionally, the infrastructure employed in a tactical environment may be limited, which can result in intermittent connectivity between users and systems that provide needed information. Thus, a user may encounter a situation where one or more information providers are temporarily unavailable when the user is attempting to obtain needed information from the provider(s), and where the information the user is attempting to obtain needed is important to making a mission decision. In such event, the user may need to make a decision without the benefit of having been able to obtain and consider the most pertinent information.

Currently, the "Publish and Subscribe" approach provides one way to mitigate the problem of lack of timely information. This technique first requires topics to be created by information providers. Topics must be set up prior to use by providers that publish data into an appropriate topic. Consumers can then subscribe to a certain topic of interest to obtain the data.

The "Publish and Subscribe" approach has several limitations. For one, it is not practical to maintain a list of topics in a changing environment (e.g., a tactical environment where individuals or assets are entering or leaving the environment) or where it is difficult to predict what the topics will be. It also requires active management by both the data publisher and data subscriber. In other words, providers have to actively put information, or at least the metadata of information, into the topic bins. Consumers are then required to go to the appropriate bins to obtain the information of interest. Consumers must also determine which information is relevant to the transaction request at hand. This task is often too burdensome for most consumers or users, especially in a rapidly changing environment such as a tactical environment. Overall, the Publish and Subscribe method may be acceptable for well structured small groups but it quickly becomes unmanageable for larger or ad hoc networks.

SUMMARY

The present disclosure is directed to a system and method for passively monitoring information requests being made by a consumer, over a network, to an information provider, and providing information that is similar or exactly to what the consumer is requesting in the event the information provider becomes unavailable to respond to the information request.

In one implementation a method is provided for enabling a transaction between a consumer and a provider in communication over a network, in the event of unavailability of the provider. The method involves using a consumer to send a request for information over the network to a provider. When the provider is available, the provider provides the requested information to the consumer. A network agent is used to monitor communications between the consumer and the network provider that occur over the network and to capture and store at least one parameter indicative of each specific type of information being requested by the consumer. The network agent also captures and stores the information being provided by the provider in response to the information request. In the event the provider is unable to respond to a subsequent request for information from the consumer, the network agent senses this failure to respond and transmits stored information that best matches (or best relates to) a detected parameter of the subsequent request, to the consumer. In this manner the network agent acts as a passive device to monitor the specific information requests being made by the consumer, to store the information associated with each specific request, and to provide information that is similar to, or exactly corresponds to, the requested information when the provider does not respond to the request.

In another implementation the system waits a predetermined time before determining that the information provider is unavailable to respond to a particular information request, and then automatically obtains stored information from a database that best matches the information being requested by the consumer. The system then provides this information to the consumer. Since the network agent acts as a passive device, it has no affect on routine communications between consumer and the information provider.

In another implementation the information requests being made by the consumer are categorized according to metadata associated with each specific information request. The metadata may be viewed as forming "tags" or identifiers that the system uses to associate specific information requests with specific types of information being provided by the provider to the system. The tags or identifiers may relate to specific words, for example words that indicate specific topics; to types of information being requested (e.g., graph, map, video file, audio file, etc.); or to timeframes that are being specified (i.e., between specific dates). The system uses the metadata to categorize the information being stored so that a closest possible match may be quickly made to the type of information being requested by the consumer when the provider does not respond to the request by the consumer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a flowchart of major operations performed by one implementation of the system, as seen from the perspective of the consumer.

DETAILED DESCRIPTION

The following description is merely exemplary in nature and is not intended to limit the present disclosure, its application or uses.

Figure 1:
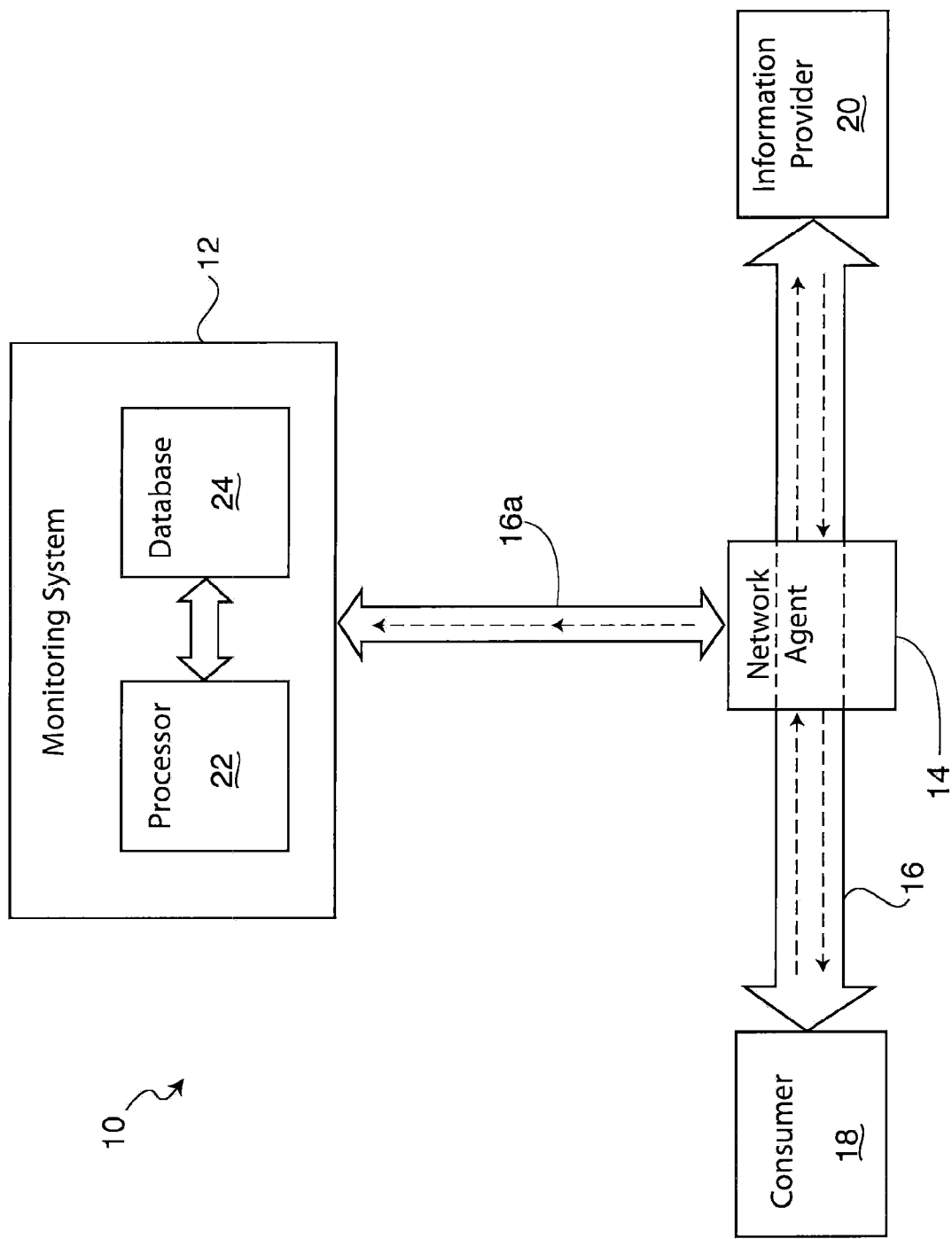
FIG. 1 is a simplified block diagram of one embodiment of a system in accordance with the present disclosure.

Referring to FIG. 1, there is shown a system 10 in accordance with one embodiment of the present disclosure. The system 10 generally includes a passive monitoring and information caching and supply system 12 (herein after simply the "monitoring system" 12), and a network agent 14. The network agent 14 is in communication with a network 16 and with the monitoring system 12 via a bus 16a. The network 16 will typically be a wide area network (e.g., the Internet), but could also be an intranet or even a local area network. A "consumer" or requestor 18 accessing the network 16 makes requests for information from an information provider 20. During a normal or typical course of action, the provider 20 provides the requested information to consumer 18. It will also be appreciated that while only a single consumer 18 is illustrated as accessing the network 16, that in practice a plurality of independent consumers may be simultaneously accessing the network. Similarly, while only a single information provider 20 is illustrated, more than one information provider will often be operating on the network. Still further, the network agent 14 may be on the network 16 between two hosts or even associated with a particular host such as a device being used by the consumer 18 or by a system associated with the provider 20. The system 10 is able to monitor, capture and store parameters associated with an information request from any number of different consumers 18 operating on the network 16, as well to store information being transmitted from virtually any number of information providers operating on the network.

The monitoring system 12 operates as a "passive" device on the network 16 so that its presence is not apparent to the consumer 18. The monitoring system 12 may include a processor 22 that is in bidirectional communication with a database 24. The database 24 effectively forms a cache for storing information, as will be described more fully in the following paragraphs.

The network agent 14 may comprise a router having a software program for monitoring and copying requests for information, or information or data, that is being transmitted over the network 16. However, any type of component that is able to be interfaced to the network 16, and able to monitor and copy information on the network 16, may be employed. In either event, the network agent 14 is preferably transparent to the consumer 18 and the information provider 20, meaning that the requestor and the provider do not perceive the network agent 14 to be present on the network 16.

The network agent 14 continually monitors the information requests being made by the consumer 18. The network agent 14 captures and transmits each information request to the monitoring system 12 via bus 16a. The processor 22 may use metadata associated with the information request or any other parameter that helps to define or categorize the information being requested. The information transmitted by the provider 20 is transmitted back over the network 16 to the consumer 18. The network agent 14 also captures a copy of this information and transmits it, via bus 16a, to the processor 22. The processor 22 "tags" or associates the information with the specific metadata or parameter(s) associated with the just-made information request, and then stores both the metadata or parameter(s) and the copied information in the database 24. In this manner the monitoring system 12 continuously adds to the quantity of information being stored in the database 24 each time a successful information exchange occurs between the consumer 18 and the provider 20. Each specific item of information in the database 24 may be categorized by one or more items of metadata or parameters, thus increasing the likelihood that the monitoring system 12 will be able to provide exactly the specific type of information that is being requested by the consumer 18 in the event the provider 20 is unavailable to respond to an information request. FIG. 1 illustrates requests for information, or information, being generated by either the consumer 18 or the information provider 20 with dashed lines and arrows within the network 16 (i.e., within the network bus designator) and within bus 16a that connects the network agent 14 and the monitoring system 12.

An advantage of the system 10 is that the process of building up or populating the database 24 is "transparent" to the consumer 18. By this it is meant that the capturing and caching of information tags or parameters associated with each specific information request, and its associated data, has no affect (such as delay or interruption) on the communications between the consumer 18 and the provider 20.

Figure 2:
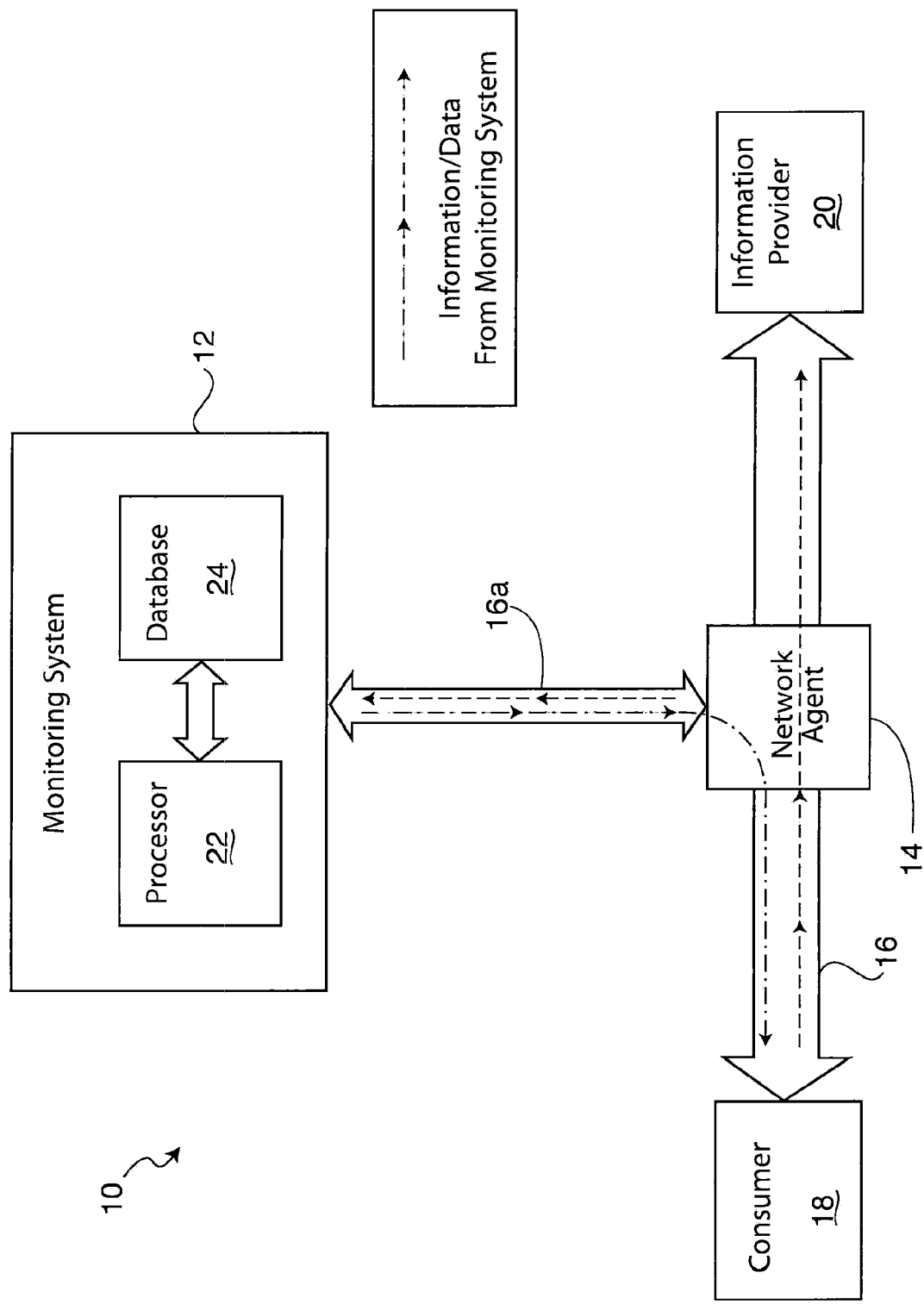
FIG. 2 is a simplified block diagram of the system of FIG. 1 illustrating the operations that occur when the provider is not available to respond to an information request by a consumer.

Referring to FIG. 2, an illustration of information flow with the system 10 is shown when the provider 20 is not available to respond to an information request from the consumer 18. For this example it will be assumed that the unavailability of the provider 20 is not just a momentary unavailability, but that it meets or exceeds a predetermined "timeout" or waiting period, for example 10-60 seconds. After this period has expired, the network agent 14 assumes that the provider 20 will not be responding to a specific information request and then transmits the request for information to the monitoring system 12 via the bus 16*a*.

It also possible that the network agent 14 could be configured with its own processor that runs software that recognizes specific types of metadata present in the request for information, and then assigns different timeout periods for different types of recognized metadata. For example, if certain types of metadata indicate a request for information of a highly urgent nature, then a shorter timeout period (maybe 10 seconds) may be set. For other types of metadata that indicate a request for information that is not highly time sensitive, then a longer timeout period may be implemented (e.g., 60 seconds).

Once the timeout period expires, the processor 22 accesses the data base 24 and uses the metadata or parameter that has been obtained from the information request sent by the consumer 18. The just-obtained metadata or parameter is used by the processor 22 to obtain information from the database 24 that is the closest match to the information that the processor 22 believes has been requested by the consumer 18. The retrieved information from the database 24 is then transmitted back to the consumer 20 via the network 16. Dot and dashed arrows within bus 16*a* and bus 16 indicate information being supplied by the monitoring system 12 to the consumer 18. Alternatively, another communication link could be used, for example, a radio frequency (RF) link or an optical communications link. However, it is anticipated that using the network 16 will be the easiest and most convenient way to supply the information from the monitoring system 12 to the consumer 1B.

Any suitable method of matching may be used, but one that is especially well suited is a method that involves identifying specific metadata associated with the request for information, matching the identified metadata to predetermined terms that fall in specific categories, and assigning a matching score that indicates how close (i.e., best) the identified metadata matches the predetermined term(s) of the categories that it is associated with. The matching operation may be performed by the processor 22, but it is possible that if the network agent 14 includes its own processor, that this capability could be programmed into the network agent via suitable software. Suitable commercially available software that may be used for the matching operation is available from Saffron Technology Inc., of Morrisville, N.C.

Figure 3:
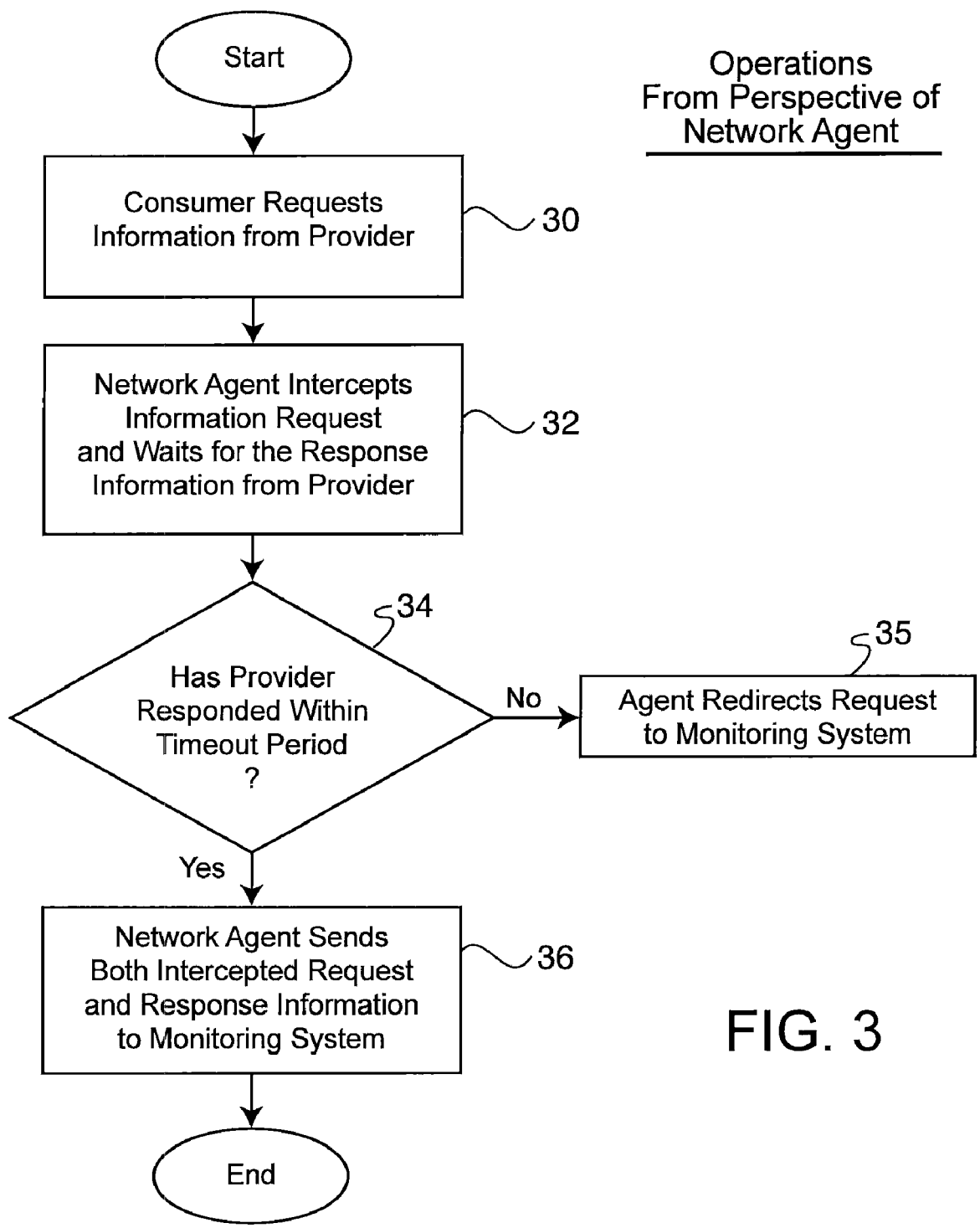
FIG. 3 is a flowchart of major operations performed by one implementation of the system when monitoring network communications between the consumer and the provider.

FIG. 3 illustrates a flowchart that sets forth several major operations performed by the network agent 14 while monitoring the network 16. Initially at operation 30 the consumer 18 requests specific data from the provider 20. The network agent 14 captures a copy of the information request and extracts metadata or other parameters therefrom that can be used to categorize the information request, as indicated at operation 32. The network agent 14 then waits for the predetermined timeout period to expire to see if the provider 20 responds, as indicated at operation 34. If the provider 20 responds within the timeout period, then the network agent 14 captures a copy of the information that is transmitted back from the provider 20 to the consumer 18, and then transmits the metadata and/or other parameters, along with the copy of the information sent by the provider 20, back to the monitoring system 12, as indicated at operation 36. The metadata or parameter(s) and its associated information are then stored by the processor 22 in the database 24 for future use. Returning briefly to operation 34, if the provider 20 does not respond within the timeout period, then the network agent 14 redirects the information request to the monitoring system 12, as indicated at operation 38.

Figure 4:
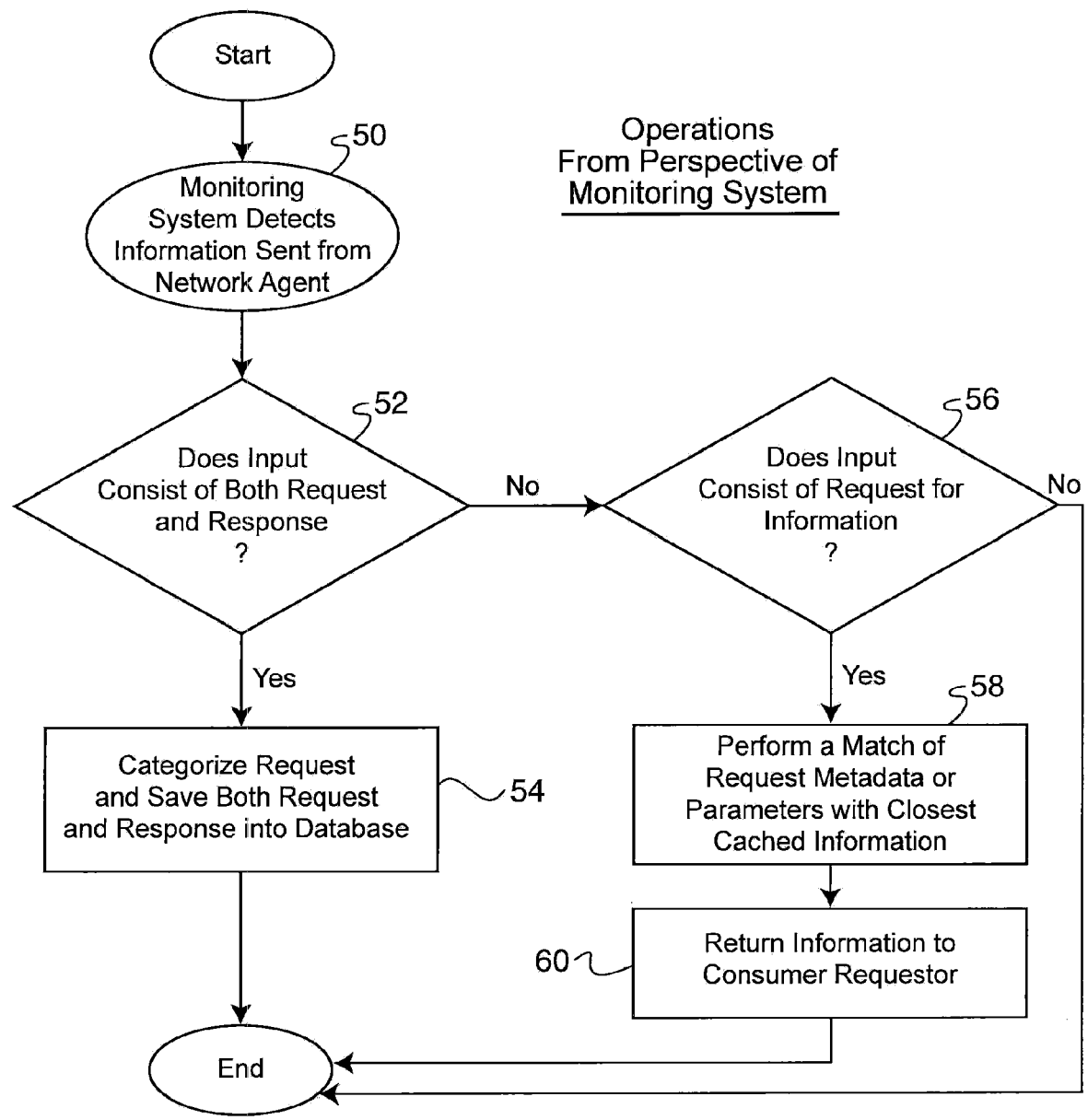
FIG. 4 is a flowchart of major operations performed by one implementation of the system, as seen from the perspective of the system.

Referring now to FIG. 4, a flowchart is provided that illustrates major operations performed by the system 10 while monitoring the network 16. The request sent by the consumer 18 is detected by the monitoring system 12, as indicated at operation 50. At operation 52 the processor 22 makes a determination if the information being supplied to it by the network agent 14 is both a request for information as well as a response from the provider 20. If the inquiry at operation 52 produces a "Yes" answer, then the processor 22 categorizes the request using metadata or one or more parameters associated with the information request, and saves the metadata or parameter(s) together with the associated copy of the information in the database 24, as indicated at operation 54. If the inquiry at operation 52 produces a "No" answer, then a check is made to determine if the input being supplied by the network agent 14 consists only of a request for information, as indicated at operation 56. If this inquiry produces a "No" answer, then no action is taken by the monitoring system 12. However, if a "Yes" answer occurs, then the processor 22 uses the metadata or other parameters associated with the information request to obtain information from the database 24 that most closely matches the specific information being requested by the consumer 18, as indicated at operation 58. At operation 60, the matched information is provided via the network agent 14 back to the consumer 18 over the network 16.

Referring to FIG. 5, a flowchart is shown that illustrates several major operations from the perspective of the consumer 18. At operation 70 the consumer 18 sends a request for information to the provider 20. If the provider 20 is operating on the network and able to respond, as indicated at inquiry 72, then the requested information is received by the consumer, as indicated at operation 74. If inquiry 72 produces a "No" answer, then the consumer 18 receives the requested information from the database 24 of the monitoring system 12, or information that most closely matches the requested information, as indicated at operation 76. To the consumer 18, there is no perception that operations 72 and 76 are being performed by an independent system operating on the network 16.

The system 10 has virtually no limitations on the types of information or data requests that can be monitored, captured, stored and acted upon with previously stored information. Thus, various types of information requests and corresponding information may be accommodated. Such various types of information and data may comprise text, graphs, maps, video files, audio files, binary information, or virtually any type of information capable of being transmitted over the network 16.

The system 10 is especially well suited to a tactical network environment where various network users are intermittently logging on to the network or leaving the network, and myriad types of information may be requested from one or more information providers operating on the network.

The system 10 enables requested information, or information that best matches the information being requested by a consumer, to be quickly supplied to the consumer even when the principal information provider is not able to respond to a request. This can enhance the decision making process by ensuring that a given user will be able to obtain requested information, or information most closely related thereto, that is needed to make a decision.

Another benefit of the system 10 is that it does not require modifications to existing networks, nor is it time consuming or complicated to interface to an existing network. The system is further not limited to only certain types of networks, but rather can be implemented on virtually any form of network. This significantly enhances the applicability of the system 10 to a wide variety of commercial and military applications.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for enabling a transaction between a consumer and a provider in communication over a network, in the event of unavailability of the provider, the method comprising:

using a device to enable a consumer to send a plurality of requests request for information over a network to a provider;

using said provider to provide information in accordance with said requests for information to said consumer;

using a network agent to monitor communications between the consumer and said network provider occurring on said network and to capture and store, in a database, at least one parameter indicative of a specific type of information being requested, for each said request for information from said consumer directed to said provider, and to capture and store, in said database, each said quantity of information being provided by said provider to said consumer in response to each one of said plurality of information requests request;

wherein said at least one parameter relates to metadata; and said metadata is correlated to said one of said stored quantities of information being transmitted by said provider;

in the event said provider is unable to respond to a subsequent request for one of said quantities of information from said consumer, sensing said failure by said provider to respond to said subsequent request and identifying one of said stored parameters, in said database, that matches or is closely related to a detected parameter for said subsequent request for one of said quantities of information, stored within said database, that is being requested by said consumer, and transmitting said one of said stored quantities of information from said database, to said consumer; and storing each said information request and its associated said at least one parameter in said database in a matter that is transparent to said consumer while uninterrupted communications between said provider and said consumer are occurring.

2. The method of claim 1, further comprising waiting a predetermined time once said subsequent request has been initiated by said consumer before transmitting said one of said stored quantities of information to said consumer.

3. The method of claim 1, wherein said detected parameter relates to metadata that categorizes said request for information.

4. A method for enabling a transaction between a consumer and a provider in communication over a network, in the event of unavailability of the provider, the method comprising:

using a device to enable a consumer to send a request for information over a network to a provider;

using said provider to provide requested information to said consumer; using a network agent to monitor communications between the consumer and said network provider occurring on said network and to capture at least one parameter indicative of each said request for information being transmitted by said consumer to said provider, and to capture a copy of each quantity of said requested information being provided by said provider to said consumer in response to each said request for information;

wherein said capturing at least one parameter comprises capturing metadata associated with each said request for information;

categorizing said captured parameter;

storing said categorized, captured parameters and a copy of each quantity of said requested information being transmitted by said provider to said consumer in a database during a plurality of successful information exchange transactions between said consumer and said provider;

in the event said provider does not respond to a specific information request; then detecting the failure of said provider to respond to said specific information request;

analyzing said stored, categorized, captured parameters within said database to find a specific one of said stored, categorized, captured parameters parameter that matches, or that most closely matches, a detected parameter associated with said specific information request;

transmitting information to said consumer that corresponds to said detected parameter; and the network agent operating to store a copy of each said requested information provided by said provider, along with and its associated said at least one parameter, while uninterrupted communications between said provider and said consumer are occurring.

5. The method of claim 4, wherein said detecting the failure of said provider to respond to said specific information request comprises waiting for a predetermined time period for said provider to respond, before concluding that said provider will not respond.

6. The method of claim 4, wherein said monitoring by said network agent is not apparent to said consumer when making each said request for information.

7. A method for enabling a transaction between a consumer and a provider in communication over a network, in the event of a failure of the provider to respond to a request for information made by said consumer over said network, the method comprising:

using a device to enable a consumer to send requests for information over a network to a provider;

using said provider to provide quantities of requested information to said consumer in response to said requests for information;

using a network agent to monitor communications between the consumer and said network provider occurring on said network and to capture and store metadata parameters that categorize said information being requested by said consumer, and to capture and store copes of said quantities of information being provided by said provider in response to said requests for information;

building a database of using said captured and stored metadata parameters and their associated said quantities of information over a plurality of successful communications between said consumer and said provider;

in the event said provider is unable to respond to a subsequent request for information, using said network agent to sense said failure by said provider to respond;

determining, from a comparison made between a detected meta data parameter associated with said subsequent request for information and said captured and stored meta data parameters, what quantity of stored information in said database is attempting to be obtained by the consumer through the subsequent request for information, and transmitting a specific stored quantity of information from said database to said consumer that has an associated said meta data parameter that is identical to, or most closely matches, the detected meta data parameter; and the network agent operating to store each of said requests for information and their associated said metadata parameter while uninterrupted communications between said provider and said consumer are occurring.

8. The method of claim 7, further comprising waiting a predetermined period of time after each said subsequent request for information before concluding that said provider is not available to respond.

9. The method of claim 7, wherein said using said network agent to monitor said communications comprises monitoring said communications in a fashion that is transparent to said consumer.

10. A system for enabling a transaction between a consumer and a provider in communication over a network, in the event of unavailability of the provider, the system comprising:

a network agent that monitors communications between a consumer and a network provider occurring on said network, and that captures at least one parameter indicative of a specific type of information being requested, for each information request transmitted by said consumer, and that captures each quantity of information being transmitted by said provider to said consumer in response to each said information request;

wherein said capturing at least one parameter comprises capturing metadata associated with each said information request;

a monitoring system responsive to said network agent that stores said one parameter associated with each said information request, and each said quantity of information transmitted by said provider, in response to each said information request from said consumer, said monitoring system further adapted to detect when said provider does not respond to a subsequent request for information from said consumer and to determine, from a detected parameter associated with said subsequent request for information and from said at least one stored parameter for each said quantity of information that has been stored, what specific one of said quantities of information that have been stored said consumer is attempting to obtain, and to supply said specific one of said quantities of stored information to said consumer that has an associated at least one parameter that best matches said detected parameter associated with said subsequent request for information being transmitted by said consumer; and the monitoring system operating to store each said quantity of information supplied by said provider to said consumer, along with the at least one parameter associated with each said quantity of information, while uninterrupted communications between said provider and said consumer are occurring.

11. The system of claim 10, wherein said monitoring system comprises a database for storing said at least one parameter for each said quantity of information being provided by said provider to said consumer.

12. The system of claim 10, wherein said monitoring system repeatedly stores said at least one parameter along with its associated said quantity of information, in a manner that is transparent to said consumer.

* * * * *